Patented Dec. 6, 1949

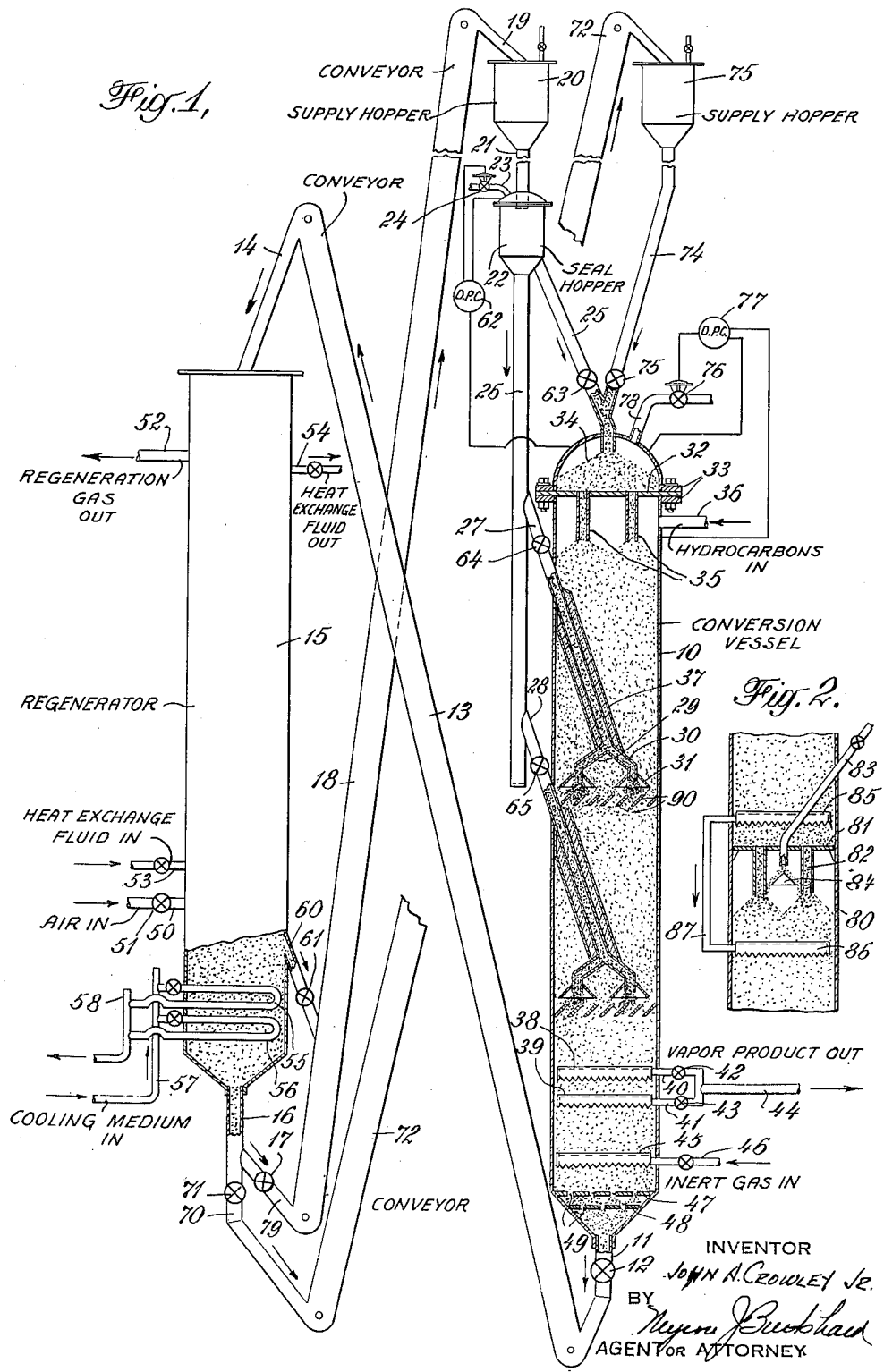
Dec. 6, 1949     J. A. CROWLEY, JR     2,490,336
METHOD FOR CONVERSION OF PETROLEUM HYDROCARBONS
Filed Nov. 17, 1945

2,490,336

UNITED STATES PATENT OFFICE 2,490,336

METHOD FOR CONVERSION OF PETROLEUM HYDROCARBONS

John A. Crowley, Jr., Scarsdale, N. Y., assignor to Socony-Vacuum Oil Company, Incorporated, a corporation of New York Application November 17, 1945, Serial No. 629,311

18 Claims. (Cl. 196—52)

This invention has to do with a method for conversion of hydrocarbons to valuable products in the presence of a contact mass material which may be catalytic in effect. Exemplary of such conversion processes are the catalytic cracking conversion of high boiling hydrocarbons for production of gasoline; catalytic vis-breaking of hydrocarbons; catalytic polymerization, isomerization, aromatization, cyclicizing, alkylation and reforming of usually relatively low boiling hydrocarbon fractions and catalytic treating and desulfurization of petroleum fractions. Typical of such processes is the catalytic cracking conversion of hydrocarbons, it being well known that gas oils boiling in the range about 450° F. to 800° F. upon contact with adsorbent type catalytic particles at temperatures of the order of 800° F. and upwards and at generally superatmospheric pressures may be converted to gasoline, gas and cycle stocks with the resultant deposition of carbonaceous contaminants on the catalytic material. These carbonaceous deposits cause a decline in the catalytic effectiveness of the catalyst for the conversion reaction and must be removed, usually by burning in order to restore the activity of the catalyst to make feasible its further use.

Typical of the catalytic materials which may be used in such processes are natural and treated clays, bauxite, and synthetic associations of silica, alumina, or silica and alumina to which other constituents such as certain metallic oxides may be added for special purposes inherent in particular processes.

Such contact materials may take the form of pellets, spheres or granular materials and may vary widely in particle size depending upon the particular type of process in which they are employed. Thus, for example, in processes wherein said contact materials are passed through conversion zones as substantially compact columns of moving particles the average particle size may preferably range between 4–10 mesh as determined by a standard Tyler screen analysis. It will be understood that in many operations materials of much smaller particle size may be employed.

Recently such catalytic conversion processes have been developed in a form wherein catalytic material is passed cyclically through a conversion zone wherein it is contacted with hydrocarbon reactants to effect the conversion thereof and causing deposition of carbonaceous contaminants on the catalyst and then through a regeneration zone wherein the spent catalyst is contacted with a combustion supporting gas such as air, acting to burn off the contaminants from the catalyst.

This invention is particularly directed to an improved method of operation for such continuous cyclic types of conversion processes. In such conversion processes heat may be released or more generally absorbed by the conversion reaction causing heating or more generally cooling of the catalytic material as it passes through the elongated conversion zone. As a result the conversion takes place over a wide range of temperatures, some of which may be anything but desirable rather than over a controlled relatively narrow range of temperatures particularly suitable for the particular conversion involved. Heretofore several methods of supplying this conversion heat have been employed. One method involves the superheating of the reactant charge to a temperature above its desired conversion temperature so as to supply the heat of reaction as sensible heat. This method has several disadvantages; in the first place the superheating of the reactant charge may cause pyrolytic cracking thereof before its introduction to the conversion zone giving rise to final products of poor quality. In the second place when superheated reactants are introduced to an elongated convertor to pass therethrough concurrently with the catalyst movement, a gradual decline in the conversion temperature occurs as the material passes through the convertor so that near the inlet to the convertor temperatures above the desired conversion temperature are necessarily encountered giving rise to overcracking of the less refractive feed stock and temperatures below the desired conversion temperature are encountered near the outlet from the convertor giving rise to undercracking of the now more refractive reactant during the later stages of the conversion. On the other hand if the method is applied to a process involving countercurrent flow of reactant and catalyst through the conversion zone, excessive temperatures may result during the later stages of the conversion and it has been found that temperatures far below the desired conversion temperature occur in the intermediate section of the convertor. Another method which has been employed is to introduce the catalyst to the convertor at a temperature above the desired conversion temperature so as to provide the heat for conversion as sensible heat in the catalyst. This method also succeeds only in the supply of conversion heat but fails to provide uniform conversion temperatures throughout the conversion zone. By such a method there necessarily results excessive temperatures near the catalyst inlet to the convertor which are particularly undesirable where concurrent reactant and catalyst flow are involved and then a gradual decline in the conversion temperature as the material passes through the conversion zone. Certain other difficulties which will be discussed hereinafter are also involved in this method of operation. Still another method for supplying heat to the conversion zone is the provision of heat transfer tubes therein with the circulation of an external heat exchange medium therethrough. While this method provides somewhat more uniform conversion temperatures throughout the conversion zone it is not entirely satisfactory because it involves the supply of heat to the various sections of the conversion zone at a substantially uniform rate whereas the conversion rate and type may be anything but uniform in the various stages of the conversion so that heat may be absorbed at widely different rates in different sections of the convertor. Moreover, the provision of heat transfer tubes in the convertor greatly complicates the convertor construction thereby greatly increasing its installation cost while also increasing the operation cost due to required circulation, maintenance and temperature control of a heat exchange medium.

All of these difficulties become aggravated when the reactant is charged to the conversion zone as a liquid because of the substantially greater heat requirement for conversion of liquid hydrocarbons to gaseous conversion products than for the conversion of gaseous hydrocarbons to gaseous conversion products.

Another difficulty involved in all of the above prior art conversion processes wherein a catalyst moves longitudinally through a conversion zone is that by gradual deposition of contaminants on the catalyst, it suffers gradual decline in its catalytic effectiveness as it passes along the conversion zone. As a result the reactants contact a highly active catalyst in one section of the reaction zone and a substantially spent catalyst in another section thereof giving rise to very ununiform conversion conditions. This condition is especially undesirable in processes involving concurrent flow of reactants and catalyst because the least refractive fresh charging stock is contacted with the most active catalyst causing over-conversion in the initial stage of the process and their under-conversion in the later stages when the highly refractive residual reactants are contacted with the least active catalyst.

A major object of this invention is the provision in a continuous cyclic hydrocarbon conversion process of a method of operation which substantially eliminates the difficulties set forth hereinabove.

An important object of this invention is the provision in a process wherein hydrocarbon reactants are converted in the presence of a contact mass material moving through said conversion zone of an economical and practical method for control of substantially uniform average conversion temperatures along the length of the conversion zone.

Another object of this invention is the provision of a method for conducting hydrocarbon conversion in the presence of a moving mass of particle form catalyst which method permits flexible control of conversion conditions during the progress of the conversion.

A specific object of this invention is the provision in a process wherein hydrocarbons are converted in the presence of a compact mass catalyst moving longitudinally through a confined conversion zone of a method which permits provision of substantially uniform catalytic effectiveness along the length of the conversion zone.

A specific object of this invention is the provision in a process wherein hydrocarbon reactants are moved through an elongated conversion zone concurrently with a particle form catalyst of a method which permits adjustment of the catalyst influence on the reactants as the conversion proceeds.

A specific object of this invention is the provision of a method for conversion of liquid hydrocarbons to gaseous hydrocarbon products in the presence of a catalytic material moving through an elongated conversion zone which method permits proper supply of heat for the process as required along the length of the conversion zone.

These and other objects of the invention will become more apparent from a study of the drawings attached hereto of which Figure 1 is an elevational view, partially in section of an apparatus arrangement adapted for conducting the method of this invention and Figure 2 is an elevational view, partially in section showing a modified construction of part of the conversion vessel shown in Figure 1. Both of these drawings are highly diagrammatic in form.

Before proceeding with a description of this invention, several terms used herein in describing and in claiming this invention will be defined. The term "gaseous" is used in a sense sufficiently broad to include any specified material existing under the operation conditions involved in the gaseous phase regardless of the normal phase of that material under ordinary operation conditions. Thus for example gaseous conversion products includes not only normally gaseous materials but also materials existing normally as a liquid. The term "carbonaceous contaminant" means materials containing carbon as an important ingredient but which may also contain hydrogen combined with carbon and smaller amounts of other impurities. The term "heat damaging temperature" means temperature above which the contact material will suffer permanent substantial decrease in its efficiency for the conversion processes.

In the processes of the prior art contact material is admitted at one end of a conversion zone, passed longitudinally therethrough while contacting it therein with hydrocarbon reactants to effect their conversion and finally withdrawn from the opposite end of the conversion zone. By the method of this invention contact material, at a predetermined conversion supporting temperature is also introduced to one end of a conversion zone and withdrawn from the opposite end thereof; but in addition to this, controlled amounts of contact material are introduced to the conversion zone at at least one intermediate location along its length to join said first stream of contact material and provide more uniform conversion conditions along the entire length of the conversion zone. It will be understood that "conversion supporting temperature" as used herein in connection with the fresh catalyst charge to the conversion zone is meant a catalyst temperature such as will supply to the conversion zone the heat required to transform the convertor inlet reactant at its inlet conditions to the convertor outlet conversion products at their outlet conditions without the temperature of said catalyst dropping below a predetermined minimum conversion temperature at any location in the conversion zone.

Turning now to Figure 1, we find an elongated conversion vessel 10 which may be of any practical cross-sectional shape, but which is preferably of circular cross-sectional shape. Provided at the lower end of said vessel is a contact material discharge conduit 11 bearing flow control valve 12, said conduit connecting into a conveyor 13. The conveyor may be of any of a number of types adapted for transfer of high temperature particles such as, for example, a continuous bucket elevator. The conveyor 13 discharges solid material through a conduit 14 into an elongated regenerator 15. A contact material discharge conduit 16 is provided on the lower end of regenerator 15. Conduit 16 connects into a conduit 79 bearing control valve 17 and conduit 79 in turn connects on its other end into conveyor 18 which may be of construction similar to conveyor 13. The conveyor 18 discharges solid material through a conduit 19 into a supply hopper 20 located at an elevation above the convertor 10. An elongated feed leg 21 depends from the lower end of supply hopper 20 and terminates in the upper end of a seal hopper 22 located a suitable distance below the supply hopper but at an elevation above convertor 10. The heal hopper is provided at its upper end with a gas inlet conduit 23 bearing a diaphragm flow control valve 24 and a conduit 25 is provided for contact material flow between the lower end of seal hopper 22 and the top of convertor 10. A contact material flow manifold 26 also depends from the lower end of seal hopper 22 for supply of contact material into intermediate levels of the convertor 10 through branch supply conduits 27 and 28 which connect from the manifold 26 into the vessel 10. The conduits 27 and 28 may be provided, if desired, with insulation jackets 37 along most of that portion of length of said conduits within the conversion vessel. It will be noted that the conduits 27 and 28 connect on their lower ends into a plurality of distributor pipes, of which two are shown, namely, 29 and 30. The distributor pipes are so arranged as to distribute contact material uniformly over the entire vessel cross-section. Inverted conical shaped baffles 31 are connected to the lower end of each distributor pipe and depend below the lower end thereof. These baffles provide greater free discharge area for the solid material from the distributor pipes into the mass of solid material maintained within the convertor 10 so as to permit substantially more flow from the distributor pipes into the convertor 10 than would otherwise be possible. A row of inclined slat type baffles 90 is provided across the vessel below the conical baffles 31. The baffles 90 are suspended on their ends from the vessel shell and serve to mix the catalyst from the distributor pipes with the main column of catalyst. Across the upper section of convertor 10 is provided a horizontal partition 32 connected between the flanges 33, thereby providing a contact material surge zone 34 within the upper end of convertor 10. Uniformly distributed conduits 35 depend from the partition 32 for flow of solid contact material from surge zone 34 into the upper end of the conversion zone therebelow. A hydrocarbon inlet conduit 36 is connected to the convertor shell 10 at a level below the partition 32 and above the lower ends of conduit 35. Across the lower section of the convertor 10 are provided two vertically spaced rows of spaced gas collector troughs 38 and 39 into which channels are connected gas outlet pipes 40 and 41 bearing valves 42 and 43, respectively. These outlet pipes are connected to a vapor outlet manifold 44 for passage of reactant products to a product fractionation and finishing system (not shown). The gas collector troughs may be of a number of different constructions, such as inverted channels or inverted angles. It will be understood that the drawing is highly diagrammatic in form and that various structural modifications of the gas inlet and outlet arrangements may be substituted for those shown in the drawing. It will also be understood that for some operations the functions of the gas inlets and outlets shown may be reversed. Positioned near the bottom of the vessel 10 is another row of troughs 45 for inert gas distribution. The troughs 45 are fed through inlet conduit 46. Across the conical bottom of the vessel 10 are supported two vertically spaced partitions 47 and 48 having orifices 49, so positioned therein as to provide substantially uniform downward solid material flow across the entire vessel cross-section thereabove despite the single centrally located discharge 11.

The regenerator 15 is provided near the lower end thereof with a gas inlet conduit 50 bearing flow control valve 51 and near its upper end with a gas outlet conduit 52. Proper gas distributing and collecting means (not shown) may be provided within the vessel in association with the inlet and outlet conduits, respectively. Also proper baffling may be provided through the regeneration zone for the purpose of providing adequate passages for gas flow. Also provided is a heat exchange fluid inlet conduit 53 within the lower section of vessel 15 and a heat exchange fluid outlet conduit 54 within the upper section thereof. These heat exchange conduits may connect within the vessel into suitable manifolds which in turn are connected into properly distributed heat transfer tubes. The gas handling and heat exchange medium handling elements within the vessel may, if desired, be of the type described in U. S. Patent No. 2,227,416, issued to Payne in 1940. Near the bottom of the vessel 15 are provided cooling coils 55 and 56 which connect on their opposite ends outside of the vessel into an inlet conduit 57 and an outlet conduit 58. It will be understood that no novelty is claimed for regenerator burning zone construction so that any suitable regenerator construction adapted for the burning of contaminant deposits from contact materials under properly controlled conditions of temperature may be employed within the scope of this invention. In considering operation according to the method of this invention, its application to the catalytic cracking conversion of a gas oil hydrocarbon may be taken as an example. In operation, the vessel 10 is maintained substantially filled with a substantially compact column of downwardly moving catalyst particles, which in this example may be a synthetic silica-alumina gel type catalyst having average particle diameters within the range of about 4–10 mesh by standard Tyler screen analysis. Hydrocarbon gas oil which may be vaporized and heated to about 800° F.–850° F. in an external heater of standard construction (not shown) is introduced into the upper end of the conversion zone through conduit 36. Hydrocarbon vapors then pass downwardly through the column of catalyst to effect the conversion thereof to lighter products, mainly gasoline, and gaseous conversion products are withdrawn from the conversion vessel through collector channels 38 and 39 and outlet pipes 40 and 41, thence through conduit 44 to an external fractionating and final treating system (not shown). Inert purge gas, such as steam or flue gas, is admitted through pipe 46 and distributed by distributor troughs 45 into the lower end of the catalyst column. This gas passes upwardly through the catalyst column to be withdrawn along with the gaseous conversion product, thereby substantially purging hydrocarbon vapors from the catalyst and preventing the escape thereof along with the catalyst from the bottom of the vessel. Spent catalyst containing a carbonaceous deposit and existing at an elevated temperature, for example, about 850° F. is withdrawn at a controlled rate through conduit 11 and flow control valve 12, and passed through conduit 11 into the conveyor 13. The spent catalyst is then discharged from conveyor 13 through conduit 14 into the upper section of the regenerator 15. It then passes downwardly through the regenerator wherein it is contacted with combustion supporting gas, such as air or flue gas, containing controlled quantities of oxygen which is admitted through conduit 50 and withdrawn from the regenerator via conduit 52. The temperature of the catalyst is controlled during its passage to the regenerator by means of heat exchange fluid introduced at 53 and withdrawn at 54 below a heat damaging temperature and above that temperature to which efficient combustion would fail. The regenerated catalyst is adjusted to suitable predetermined convertor introduction temperature by means of heat transfer coils 55 and 56 and then passes from the bottom of the regenerator through conduits 16 and 79 into the conveyor 18. If desired, the catalyst may be passed directly from the burning zone of the regenerator without substantial subsequent cooling into the conveyor 18 through conduit 60. In some operations it is desirable to cool part of the regenerated catalyst and to pass the remaining portion directly to the conveyor 18 without cooling, the amount subjected to cooling and the amounts by-passing the cooling zone being controlled by means of valves 17 and 61. The regenerated catalyst is then discharged from conveyor 18 into the supply hopper 20 which may be at atmospheric pressure. Catalyst then flows from the supply hopper at the predetermined conversion supporting temperature, for example 900° F., to the seal hopper therebelow through a gravity feed leg 21 of sufficient length to permit flow of the catalyst into the seal hopper against the gaseous pressure therein. Inert gas, such as steam or flue gas, is introduced into the top of the seal hopper 22 through conduit 23 at a sufficient rate which is controlled by diaphragm valve 24 and differential pressure control instrument 62 to maintain the gaseous pressure within the seal hopper a controlled amount above the hydrocarbon pressure within the conversion vessel 10. For example, the differential pressure controller may be set to control a seal gas pressure in the seal hopper which is always about one half pound per square inch above the gaseous pressure in the conversion vessel, thereby preventing the escape of hydrocarbons through the catalyst feed system. A portion of the regenerated catalyst is then passed through conduit 25 at a rate controlled by valve 63 thereon into the top of the conversion vessel. Catalyst is also introduced into the conversion vessel at two intermediate levels through conduits 27 and 28 at rates controlled by valves 64 and 65, respectively. It will be understood that any suitable means adapted for introduction of catalyst into a zone under gaseous pressure while preventing escape of gas from said zone may be substituted for the arrangement hereinabove described. Spent catalyst is withdrawn from the vessel through conduit 11 at a rate controlled by valve 12 equal to the total catalyst introduction through conduits 25, 27 and 28. From the above it will be seen that there is provided within the conversion zone a substantially compact column of downwardly moving particles to which column fresh catalyst existing at a predetermined conversion supporting temperature is added to two vertically spaced locations along the length thereof to supply said column and control the temperature thereof along its entire length. Since all of the catalyst is withdrawn from the same outlet 11 at the bottom of the conversion zone it will be evident that the volumetric rate of catalyst flow in the vessel 10 gradually increases being greatest below the lowermost catalyst inlet level. In this way the ratio of catalyst to volumetric reactant flow is gradually increased so as to counteract the gradual decline in catalyst activity due to contaminant deposition thereon during the hydrocarbon conversion. As a result the reactant is subjected to substantially uniform catalyst effectiveness throughout the length of the conversion zone, which is impossible in the case of prior art methods wherein all of the catalyst is introduced to the top of the conversion zone. Moreover, by the introduction of fresh catalyst at intermediate levels the reactant may contact some fresh catalyst during every stage of its conversion, and it may contact a catalyst of substantially more uniform average activity throughout the conversion zone than would be possible if all the fresh catalyst were introduced to the upper end of the conversion zone. In addition to these advantages, a practical range of conversion temperature may be provided along the length of the conversion zone. For example, assuming that the volumetric rates of catalyst introduction through conduits 25, 27 and 28 to be about the same and assuming the catalyst inlet temperature to be about 900° F., the following catalyst temperature pattern may occur through the conversion zone. In that section of the vessel 10 between the conduits 35 and the inlet end of conduit 27 the catalyst may be cooled due to absorption of heat by the endothermic cracking reaction from about 900° F. to about 850° F. Then the catalyst would be heated to about 875° F. at the location of catalyst introduction from conduit 27 by the catalyst introduced at that level. The catalyst may then cool to about 845° F. before reaching the next and final level of catalyst introduction, at which level it will be again heated to about 860° F. by the catalyst introduced at that level. The catalyst may then cool to about 850° F. before it reaches the bottom of the conversion zone due to further hydrocarbon conversions. It will be apparent that in the above example the average conversion temperature in the upper, intermediate and lower sections of the convertor were about 875° F., 860° F. and 855° F. respectively. Thus the drop in average conversion temperature along the length of the conversion zone was in the above example limited to about 20° F. which represents good conversion temperature control from a practical standpoint. The drop in average conversion temperature across the length of the conversion zone under a similar operation would have been substantially greater if all of the catalyst had been introduced into the upper end of the convertor through conduit 25 as is the prior art practise. Even better temperature control may be provided by a somewhat modified method of operation. Thus in the above example about one-third of the regenerated catalyst may be cooled by tubes 55 and 56 to about 890° F. and passed via conduit 70 and throttle valve 71 to a separate conveyor 72 by which it is transferred to a separate hopper 73 above the convertor 10. This catalyst may then pass at a controlled rate through conduit 74 and control valve 75 into the chamber 34 of the convertor and from there into the conversion zone through conduits 35. In this case an inert seal gas may be introduced through conduit 78 into chamber 34 at a rate controlled by diaphragm valve 76 and differential pressure controller 77 sufficient to maintain a pressure in chamber 34 somewhat above that in the upper end of the conversion zone. The remainder of the regenerated catalyst may be withdrawn through conduits 60 and 79 into conveyor 18 at rates controlled to give a mixed catalyst temperature of about 920° F. This catalyst is discharged into supply hopper 20 and passes therefrom to the two intermediate levels in the conversion zone via conduits 27 and 28. In this operation assuming the same catalyst inlet rate through conduits 25, 27 and 28 and the same hydrocarbon charge conditions as in the previous example, the catalyst may enter the upper end of conversion zone at about 890° F. and be cooled to about 840° F. by the time it reaches the first intermediate catalyst inlet level. It is there heated to about 880° F. by the catalyst introduced through conduit 27 and then may cool to about 850° F. before it reaches the next catalyst inlet level. The catalyst may again be heated to about 875° F. by catalyst entering through conduit 28 and then cool to about 865° F. before reaching the bottom of the conversion zone. In this example it will be apparent that the average conversion temperatures in the upper, intermediate and lower sections of the conversion zone are about 865° F., 865° F. and 870° F. respectively. Thus it will be clear that by this modified method of operation substantially uniform average conversion temperatures are provided all along the conversion zone.

It will be understood that by proper adjustment of the catalyst inlet temperatures and rates to the top and to the intermediate sections of the conversion zone an actual rise in average conversion temperatures may be provided if desired. Moreover, the spread in catalyst temperatures between the levels of catalyst introduction to the conversion zone may be limited to any desirable extent by increase in the number of levels of catalyst introduction.

The method of this invention renders feasible processes wherein relatively high boiling residual stocks are to be converted and must necessarily be charged as a liquid to the conversion zone. In such applications the required heat supply loads in the conversion zone may be very high. As an example of such a process, the conversion of a high boiling residual stock having a gravity of about 23 A. P. I., an initial boiling point by vacuum assay distillation of about 820° F., a 5% point of 930° F. and a 60% point of about 1100° F. may be considered. If such a charge stock be charged at about 820° F. substantially as a liquid into the top of a conversion zone at a space velocity of about 0.7 volume oil (measured at 60° F.) per volume of catalyst in said zone and if particle form catalyst is all charged to the upper end of said zone at about 1100° F., the resulting catalyst withdrawal temperature at the bottom of the conversion zone has been found to be about 885° F. Thus in such an operation a total temperature drop of 215° F. occurs across the conversion zone and the average conversion temperature in the upper third of said zone is of the order of 1030° F. or higher while that in the lower third of the zone is only of the order of about 900° F. Now if the hydrocarbon charge conditions be maintained the same and the same total catalyst to oil ratio be employed, and about 50% of said regenerated catalyst be introduced to the top of the conversion zone at about 1000° F. and portions of the remaining 50% of regenerated catalyst be introduced at about 1200° F. at controlled rates into several properly spaced intermediate levels within the upper three quarters of said conversion zone, then the outlet catalyst temperature from the bottom of said zone will be about 885° F. It will be apparent that by this method of operation the spread between catalyst inlet at the top of the vessel and outlet temperatures from the bottom thereof has been reduced to only 115° F. Moreover, whereas in the first described operation the average conversion temperature in the lower section of the conversion zone was far below that in the upper section thereof, in the operation according to the method of this invention the average conversion temperature in all sections of the conversion zone is substantially the same and in the above example of the order of 925° F.

While the method of this invention is preferably employed in conversion processes wherein the catalyst passes through the conversion zone as a substantially compact column, its application is not to be construed as entirely limited thereto. It may also be applied to proccesses wherein powdered catalyst particles are passed through the conversion zone suspended in a gaseous stream which gas may be the conversion reactant or a mixture of an inert gas such as steam with conversion reactants, provided that the reactant is introduced to the conversion zone substantially in the gaseous phase.

It will be readily understood that the particular conversion temperatures and rates to be employed will vary widely depending upon the particular charging stock and catalyst involved and upon the desired severity of conversion. In general for processes wherein the catalyst moves through the conversion zone as a substantially compact column, the hydrocarbon charge space velocity may vary from about 0.5 to 5.0 volumes of oil (measured at 60° F.) per volume of catalyst in the conversion zone. The ratio of total catalyst to oil throughput on a weight basis may vary from about 1.5 to 20 parts catalyst to one part of oil charge. The conversion zone may vary from about 3 to 50 feet in length and the linear rate of catalyst flow may vary from about 0.5 to 8.0 feet per minute.

In processes wherein the catalyst passes through the conversion zone as a suspension, and reactants are introduced thereinto in the gaseous phase, similar catalyst to oil ratios may be employed. The average vapor velocity through the conversion zone may be of the order of about 8-12 feet per second and the vapor contact time may be of the order of about 4-8 seconds.

As will be understood from the above description of this invention the number of the levels of catalyst introduction into the conversion zone according to the method of this invention should be at least two, one being at one end of the zone. In general the greater the number of levels of catalyst introduction the narrower will be the range of catalyst temperatures between each level and the closer the overall temperature control. The exact temperature and rate proportioning of the several catalyst inlet streams will be determined by the nature of the particular conversion operation involved.

Turning now to Figure 2, we find a sectional view showing an intermediate section of a somewhat modified convertor construction. In Figure 2, 80 is the shell of an intermediate section of a convertor, somewhat similar to that shown in Figure 1. Across the shell is supported a horizontal partition 81 having uniformly distributed tubes 82 depending therefrom for catalyst flow to the section therebelow. A conduit 83 is provided for hot fresh catalyst introduction. Below the end of conduit 83 is a baffle 84 which serves to distribute the flow of hot fresh catalyst uniformly onto the surface of the cooler partially spent catalyst from the convertor section thereabove; a row of gas collection troughs 85 is provided just above partition 81 and a row of gas distributor troughs 86 is provided a short distance below the ends of tubes 82. Jumper pipes 87 are provided for gas flow between the collector and distributor troughs. This construction permits mixing and temperature equalization between the hot catalyst introduced through conduit 83 and the cooler catalyst passing down through tubes 82 substantially in the absence of that portion of the hydrocarbon reactants which are present in the gaseous phase.

It will be apparent from the above description of this invention that this invention overcomes the disadvantages of prior art conversion processes and in addition provides a highly practical process for conversion of high boiling liquid hydrocarbon stocks. The method of this invention permits maintenance of uniform average conversion temperatures along the length of conversion zones. In addition it permits accurate control of the catalyst influence on the conversion during various stages thereof. It permits provision of more uniform catalyst activity throughout the conversion zone than prior art processes. These advantages result in improved convertor capacities, and better control over the final properties of the conversion products. The cost of equipment and operation is reduced over those of many prior art methods because the heat obtained from the contaminant regeneration is utilized for the heat required for the conversion and this without requirement for complicated and expensive heat transfer systems.

It will be understood that the particular examples of operating conditions and of application of this invention discussed hereinabove are merely exemplary in character and are not to be construed as limiting the scope of this invention except as it may be limited in the following claims.

I claim:
1. The method for conversion of hydrocarbon reactants in the presence of a contact mass material which comprises: introducing a stream of freshly regenerated contact mass material into only one end of an elongated conversion zone at a temperature substantially above the average conversion temperature in said zone, passing said stream of contact material through said conversion zone, passing hydrocarbon reactant through said zone in contact with said contact material to effect the endothermic conversion of said hydrocarbons, withddrawing gasiform hydrocarbon conversion products from said zone, introducing freshly regenerated contact mass material at a temperature substantially above the average conversion temperature in said zone into said conversion zone at at least one intermediate location along the length thereof to mix with said first stream of contact material, maintaining substantially constant the average temperature of the contact material stream flowing in said zone between the locations of contact material introduction and between the last intermediate location of its introduction and the location of its withdrawal from said conversion zone and controlling the inlet contact material temperature and rate at said locations of its introduction along said zone to supply as excess sensible heat in the contact material alone at least most of the heat required to so maintain the average temperature of the contact material stream along said zone.

2. The method for conversion of hydrocarbon reactants in the presence of a contact mass material which comprises: introducing a stream of fresh contact mass material substantially at a predetermined conversion supporting temperature into one end of an elongated conversion zone, passing said stream of contact material through said conversion zone while contacting it therein with fluid hydrocarbon reactants to effect the conversion thereof, withdrawing gaseous hydrocarbon conversion products from said zone, introducing at least one other stream of fresh contact mass material at a temperature substantially above the introduction temperature of said first stream into said zone at at least one location along its length intermediate its ends to mix with said first named stream and upwardly adjust the temperature thereof sufficiently to supply at least a major portion of the heat absorbed by said hydrocarbon conversion and withdrawing the spent contact mass material from the opposite end of said conversion zone.

3. A method for conversion of high boiling hydrocarbons into valuable lower boiling products in the presence of a particle form adsorbent material which method comprises the steps: maintaining a substantially upright, confined, compact column of downwardly moving, heated, particle form adsorbent material, introducing a heated high boiling substantially liquid petroleum fraction onto the upper end of said column, withdrawing gaseous conversion products from said column near the lower end thereof, withdrawing spent adsorbent material bearing carbonaceous contaminants from the lower end of said column at a controlled rate, maintaining a confined accumulation of fresh heated adsorbent material at a location above said column, passing said adsorbent material from said accumulation into said column at a plurality of spaced vertical locations beginning with the upper end thereof at controlled rates, the temperature of said heated adsorbent material being sufficiently high to supply the heat required for the change of said heated high boiling substantially liquid petroleum charge to said gaseous conversion products while maintaining a suitable conversion temperature throughout the length of said column.

4. A process for conversion of high boiling hydrocarbons into high-quality gasoline in the presence of a moving contact mass material which comprises: moving a stream of particle form contact material through an elongated conversion zone, introducing heated, high boiling substantially liquid hydrocarbons into said zone to contact said contact material therein so as to effect the conversion of said hydrocarbons to lower boiling hydrocarbons, withdrawing gaseous hydrocarbon conversion products from said zone at a location remote from that of hydrocarbon introduction, withdrawing spent contact material from only one end of said conversion zone and passing it through a separate regeneration zone while contacting it with a combustion supporting gas acting to burn off said carbonaceous contaminant and while controlling the contact material temperature below a level which would cause permanent heat damage to the contact material, introducing regenerated contact material from said regeneration zone at a temperature substantially above the average stream temperature in said conversion zone into said conversion zone at a plurality of spaced locations along its length beginning with the end of said conversion zone opposite that of spent contact material withdrawal to join said first named stream of contact material moving through said conversion zone in a substantially single longitudinal direction, maintaining substantially constant the average temperature of the portions of the contact material stream flowing in said conversion zone between the locations of its introduction and between the last location of its introduction and the location of its withdrawal, and controlling the temperature and rate of contact material introduction at said locations to effect supply in the contact material introduced at least most of the heat required to maintain said average stream temperature as aforesaid.

5. A catalytic hydrocarbon conversion method comprising: maintaining a substantially compact, confined, vertical column of particle form catalyst, passing a heated hydrocarbon reactant through said column to effect the conversion thereof, withdrawing gaseous reaction products from said column, withdrawing spent catalyst bearing a carbonaceous deposit from the lower end of said column at a controlled rate, maintaining a supply accumulation of heated fresh catalyst at a location above said confined column and at a conversion supporting temperature, passing catalyst from said supply accumulation into a substantially confined seal zone wherein it is maintained under an inert gaseous pressure which is above the hydrocarbon pressure in said column, passing catalyst as a substantially compact stream from said seal zone to the upper end of said column at a controlled rate, passing catalyst as a substantially compact stream from said seal zone to at least one location within said column intermediate the ends thereof.

6. A continuous cyclic method for the catalytic conversion of fluid hydrocarbons into high-quality gasoline which comprises: moving catalyst through a conversion zone at suitable conversion temperature conditions as a substantially compact, vertical column of downwardly flowing particles while contacting it within said conversion zone with heated fluid hydrocarbons to effect the conversion of said hydrocarbons and resulting in the deposition of carbonaceous contaminants on said catalyst, withdrawing spent catalyst from the bottom of said conversion zone and passing it to a high temperature regeneration zone, passing said catalyst through said regeneration zone while contacting it with a combustion supporting gas acting to burn said carbonaceous contaminants and while controlling the catalyst temperature below a heat damaging level and above a level at which efficient burning would fail, withdrawing regenerated catalyst from said regeneration zone and returning it in a heated condition and in the absence of substantial gas flow as separate substantially compact streams of controlled amount to a plurality of levels within said conversion zone of which one is the upper end thereof and of which all are substantially above the lower end thereof to supply said column of catalyst moving within said conversion zone.

7. A cyclic process for catalytic cracking conversion of hydrocarbon fluids which comprises the steps: maintaining a substantially compact, column of particle form catalyst substantially throughout a conversion zone, passing heated fluid hydrocarbon reactants through said column within said zone to effect the conversions thereof, withdrawing gaseous conversion products from said conversion zone, withdrawing spent catalyst bearing a carbonaceous contaminant deposit from the lower end of said zone, passing said spent catalyst through a regeneration zone while contacting it therein with a combustion supporting gas to burn said deposit and while controlling the catalyst temperature below a heat damaging level and above a level at which efficient combustion would be impossible, withdrawing regenerated catalyst from said regeneration zone and passing it in a heated condition to a confined accumulation of regenerated material maintained above said conversion zone, maintaining an inert gaseous pressure above said confined accumulation a controlled amount above the reactant pressure within said conversion zone, and passing catalyst in absence of substantial gas flow from said accumulation at controlled rates to a plurality of levels within said conversion zone of which one level is the upper end of said conversion zone so as to replenish said column of catalyst within said conversion zone and to maintain suitable conversion temperatures along the entire length of said conversion zone.

8. A process for conversion of high boiling hydrocarbons into high-quality gasoline in the presence of a moving contact mass material which comprises: maintaining a supply accumulation of fresh contact material at a predetermined elevated temperature withdrawing contact material from said accumulation and introducing a portion of it into one end of an elongated confined conversion zone and the remainder into said zone at at least one other location intermediate the ends thereof, withdrawing spent contact material from the opposite end of said zone at a controlled throttled rate so as to maintain substantially throughout said zone a substantially compact column of downwardly moving particles wherein the downward rate of flow of particles increases from its upper end at each location of contact material introduction, introducing heated substantially liquid hydrocarbon reactant into the upper section of said conversion zone to contact said contact material and to effect its conversion, withdrawing gaseous conversion products from the lower section of said conversion zone, passing spent contact material withdrawn from said zone through a confined regeneration zone while contacting it therein with regeneration gas acting to burn said deposit and while controlling its temperature therein below a heat damaging level but sufficiently high to promote efficient burning of said deposit, withdrawing regenerated contact material from said regeneration zone and passing it at said predetermined elevated temperature to said supply accumulation, wherein said predetermined temperature and the rate of contact material flow from said supply accumulation to said conversion zone are such as to provide a suitable conversion temperature substantially throughout said zone and to supply the heat for conversion of said heated liquid hydrocarbon charge to said gaseous hydrocarbon products.

9. A cyclic process for catalytic cracking conversion of hydrocarbon fluids which comprises the steps: maintaining a substantially compact column of particle form catalyst substantially throughout a conversion zone, passing gaseous hydrocarbon reactants preheated substantially to the conversion temperature lengthwise through said column within said zone to effect the conversion thereof, withdrawing gaseous conversion products from said conversion zone, withdrawing spent catalyst bearing a carbonaceous contaminant deposit from the lower end of said zone, passing said spent catalyst through a regeneration zone while contacting it therein with a combustion supporting gas to burn said deposit and while controlling the catalyst temperature below a heat damaging level and above a level at which efficient combustion would be impossible, withdrawing regenerated catalyst from said regeneration zone, adjusting the temperature of said regenerated catalyst to a predetermined level which is substantially above the average conversion temperature within said conversion zone, passing said regenerated catalyst to a confined accumulation of regenerated material maintained above said conversion zone, maintaining an inert gaseous pressure above said confined accumulation a controlled amount above the reactant pressure within said conversion zone, and passing catalyst from said accumulation at controlled rates to a plurality of levels within said conversion zone of which one level is the upper end of said conversion zone so as to replenish said column of catalyst within said conversion zone and to maintain suitable conversion temperatures along the entire length of said conversion zone.

10. The continuous cyclic method for the catalytic conversion of fluid hydrocarbons into high-quality gasoline which comprises: moving particle form catalyst through an elongated conversion zone as a substantially compact column of downwardly gravitating catalyst particles, passing heated fluid hydrocarbon reactants downwardly through said column to effect the conversion of said hydrocarbons, withdrawing gaseous conversion products from said column, withdrawing spent catalyst bearing carbonaceous deposit from the lower end of said column, passing said spent catalyst through a regeneration zone wherein it is contacted with a combustion supporting gas while controlling the temperature of said catalyst within said zone below a heat damaging level, withdrawing regenerated catalyst from said regeneration zone, cooling a portion of said regenerated catalyst to a predetermined temperature which is near to but above the desired average hydrocarbon temperature, introducing said cooled regenerated catalyst into the upper end of said conversion zone to replenish said column therein, and introducing the remainder of said regenerated catalyst at a temperature adjusted to a level which is substantially above the temperature of said cooled regenerated catalyst into said column within said conversion zone at at least one location intermediate its ends so as to upwardly adjust the temperature of said column at said intermediate location.

11. The continuous cyclic method for the catalytic conversion of fluid hydrocarbons into high-quality gasoline which comprises: moving particle form catalyst through an elongated conversion zone as a substantially compact column of downwardly gravitating catalyst particles, passing heated fluid hydrocarbons through said column within said zone to effect the conversion of said hydrocarbons, withdrawing gaseous conversion products from said column, withdrawing spent catalyst bearing carbonaceous deposit from the lower end of said column, passing said spent catalyst through a regeneration zone wherein it is contacted with a combustion supporting gas while controlling the temperature of said catalyst within said zone below a heat damaging level, withdrawing regenerated catalyst from said regeneration zone, cooling a portion of said regenerated catalyst to a predetermined conversion temperature above the desired hydrocarbon conversion temperature and passing said cooled catalyst to the upper end of said column within said conversion zone, and introducing the remainder of said regenerated catalyst at a higher temperature into said column within said conversion zone at at least one intermediate location along its length so as to upwardly adjust the temperature of said column at said intermediate location.

12. The continuous cyclic method for the catalytic conversion of fluid hydrocarbons into high-quality gasoline which comprises: moving particle form catalyst through an elongated conversion zone as a substantially compact column of downwardly gravitating catalyst particles, introducing heated substantially liquid hydrocarbon reactants into the upper section of said conversion zone into contact with said catalyst, withdrawing gaseous conversion products from the lower section of said zone, withdrawing spent catalyst bearing carbonaceous deposit from the lower end of said column, passing said spent catalyst through a regeneration zone wherein it is contacted with a combustion supporting gas while controlling the temperature of said catalyst within said zone below a heat damaging level, withdrawing regenerated catalyst from said regeneration zone, cooling a portion of the regenerated catalyst to a predetermined temperature and passing it into the upper end of said conversion zone at a controlled rate, cooling the remainder of the regenerated catalyst to a second predetermined temperature which is substantially above said first predetermined temperature and introducing it at a controlled rate into said conversion zone at at least one location intermediate its ends, wherein said predetermined catalyst inlet temperatures and controlled rates are such as to provide the heat required to convert said liquid hydrocarbon reactants to said gaseous conversion products while maintaining substantially uniform average conversion temperatures along the length of said conversion zone.

13. The method for effecting a thermochemical conversion of hydrocarbon reactants in the presence of a contact mass material which comprises: introducing a stream of contact material at a suitable temperature for said hydrocarbon conversion into one end of an elongated conversion zone, passing said stream of contact material longitudinally through said conversion zone while contacting it therein with a fluid hydrocarbon reactant to effect a thermochemical conversion thereof with resultant heat flow between the reactant and the contact material and change in contact material temperature, withdrawing gasiform hydrocarbon conversion products from said zone, introducing at least one other stream of contact material into said conversion zone at at least one location along its length intermediate its ends to join said first stream and flow along therewith, maintaining the inlet temperature of said last named stream substantially different from that of said first named stream in a direction opposite to the direction of contact material temperature change induced by said thermochemical conversion, and regulating the inlet temperature and rate of said last named stream to effect readjustment in the temperature of the contact material flowing in said conversion zone so as to exclude any substantial change in its average temperature as it flows through said zone and withdrawing used contact material from that end of said zone opposite the end of its introduction.

14. The method for conversion of hydrocarbon fluids in the presence of a particle-form contact material which comprises: maintaining a supply accumulation of said particle-form contact material at a predetermined elevated temperature, withdrawing contact material from said accumulation and introducing a portion of it into the upper end of an elongated confined conversion zone, passing said contact material downwardly through said conversion zone as a substantially compact column while contacting it with fluid hydrocarbon reactant, withdrawing used contact material at a controlled rate from the lower end of said conversion zone, baffling the flow of said column at at least one intermediate level along its length within said conversion zone so as to provide a substantial gas space open on its lower end to the contact material column, by-passing the flow of gaseous hydrocarbons around said gas space between the portion of said column above and below said gas space, passing some of said contact material from said accumulation into said gas space at a controlled rate and causing it to fall through said gas space onto the surface of the column therebelow so as to adjust the temperature of said column.

15. A method for conversion of fluid hydrocarbons in the presence of a solid contact material which comprises: moving the contact material through a conversion zone at suitable conversion temperature conditions as a substantially compact, upright column of downwardly flowing particles while contacting it within said conversion zone with heated fluid hydrocarbons to effect the conversion of said hydrocarbons to gaseous hydrocarbon products, withdrawing used contact material from the lower section of said conversion zone, and supplying the contact material moving within said conversion zone by introducing fresh contact material in a heated condition and in the absence of substantial gas flow as separate, substantially compact streams at controlled rates to a plurality of levels within said conversion zone by which one level is the upper end thereof and of which all levels are substantially above the lower end of said conversion zone.

16. A method for conversion of fluid hydrocarbons to lower boiling products in the presence of a particle form contact material which comprises: maintaining a substantially upright, confined, compact column of downwardly moving, heated, particle form adsorbent material, passing a fluid hydrocarbon charge through said column to effect conversion thereof to lower boiling hydrocarbon products, withdrawing said lower boiling hydrocarbon products from said column, introducing fresh, heated contact material at a temperature substantially above the average contact material temperature in said column into said column at a plurality of spaced vertical locations beginning with the upper end thereof at controlled rates, controlling the temperature and rate of contact material introduction at said plurality of levels to supply as sensible heat in the contact material introduced the heat required for the conversion of said fluid hydrocarbon charge to said lower boiling hydrocarbon products while maintaining a suitable narrow range of conversion temperatures throughout the length of said column.

17. In a process for hydrocarbon conversion wherein a stream of subdivided solid contact material passed longitudinally through said conversion zone to contact therein a fluid hydrocarbon to effect conversion of said hydrocarbon and wherein heat is absorbed by said hydrocarbon conversion the method for supplying the heat required for said conversion and for preventing any substantial drop in the range temperature of said contact material stream as it passes through said conversion zone which comprises: introducing contact material into one end of said conversion zone to supply said stream at a temperature above the desired average conversion temperature, introducing additional contact material into said zone to supply said stream at at least one location along said conversion zone intermediate its length at a temperature substantially above that of said contact material introduced into the end of said zone, controlling the rate and temperature of contact material introduction to all of said locations along said conversion zone such as to exclude any substantial drop in temperature range of said contact material stream as it flows through said zone and withdrawing used contact material only from one end of said zone which end is opposite said end of introduction.

18. The method for effecting endothermic conversions of fluid hydrocarbon reactants in the presence of a particle form solid material which comprises: maintaining a substantially compact column of particle form solid material in a confined upright zone, withdrawing solid material from the lower section of said zone to cause downward movement of the solid material in said column, supplying a stream of particle form solid material to the upper end of said column at a suitable temperature for said hydrocarbon conversion, passing a fluid hydrocarbon charge into contact with said solid material in said column to effect the endothermic conversion of said charge to form a hydrocarbon product existing in the gaseous phase, most of the heat for said reaction being supplied from the solid material flowing in said column, withdrawing the gasiform hydrocarbon product from said zone, introducing at least one other stream of particle form solid material at a temperature substantially above the introduction temperature of said first stream into said column at at least one location along the column length intermediate its upper and lower ends to join the solid material from said first stream and help supply the heat required for said endothermic reaction.

JOHN A. CROWLEY, Jr.

(References on following page)

REFERENCES CITED

The following references are of record in the file of this patent:

UNITED STATES PATENTS

| Number | Name | Date |
|---|---|---|
| 2,161,974 | Peck | June 13, 1939 |
| 2,325,136 | Kassel | July 27, 1943 |
| 2,325,611 | Keranen | Aug. 3, 1943 |
| 2,341,193 | Scheineman | Feb. 8, 1944 |
| 2,374,151 | Wolk et al. | Apr. 17, 1945 |
| 2,377,512 | Page | June 5, 1945 |
| 2,379,408 | Arveson | July 3, 1945 |
| 2,394,651 | Alther | Feb. 12, 1946 |
| 2,403,375 | Kassel | July 2, 1946 |
| 2,409,476 | Creelman et al. | Oct. 15, 1946 |
| 2,429,161 | Hudson | Oct. 14, 1947 |
| 2,441,170 | Rose et al. | May 11, 1948 |

FOREIGN PATENTS

| Number | Country | Date |
|---|---|---|
| 411,477 | Great Britain | Dec. 2, 1933 |